Jan. 6, 1948.  F. C. GOOD  2,433,948
UNIVERSAL JOINT
Filed Aug. 20, 1943  2 Sheets-Sheet 1
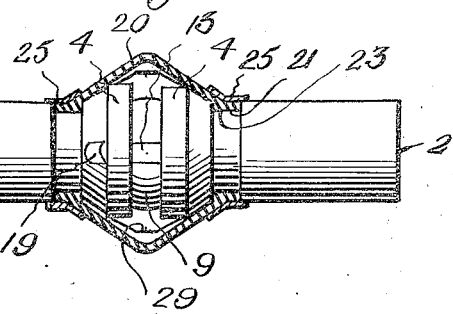
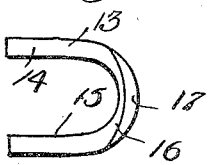
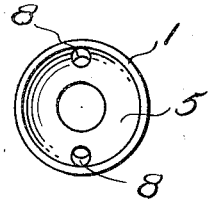
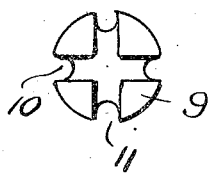
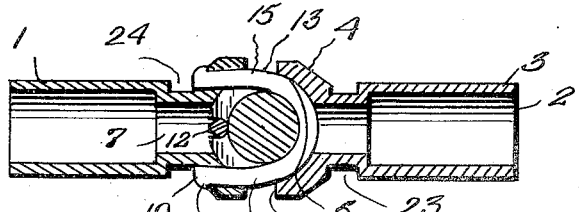
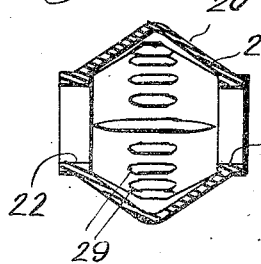
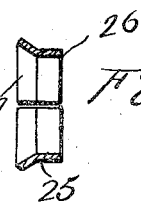
INVENTOR.
Frederick C. Good
BY Wm P. Smith
Attorney Jan. 6, 1948.　　F. C. GOOD　　2,433,948
UNIVERSAL JOINT
Filed Aug. 20, 1943　　2 Sheets-Sheet 2
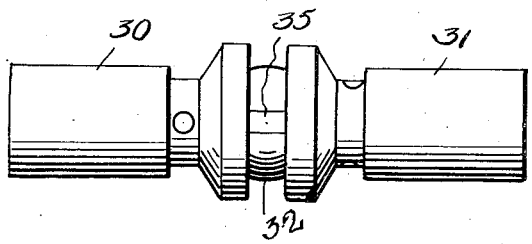
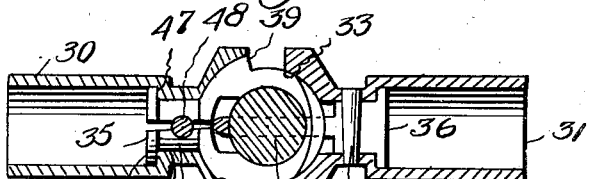
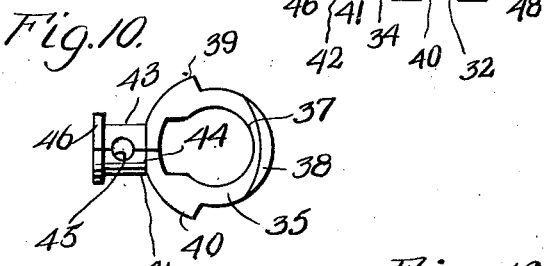
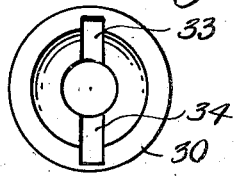
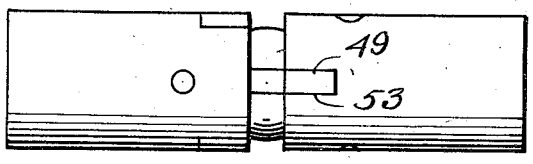
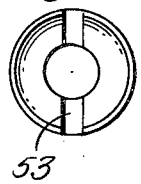
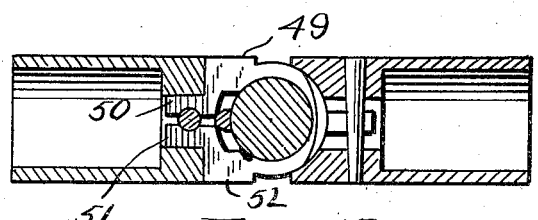
INVENTOR.
Frederick C. Good
BY
Wm P Smith
Attorney Patented Jan. 6, 1948

2,433,948

UNITED STATES PATENT OFFICE 2,433,948

UNIVERSAL JOINT

Frederick C. Good, Philadelphia, Pa.

Application August 20, 1943, Serial No. 499,311

2 Claims. (Cl. 64—16)

The present invention relates to a universal joint and has for its primary object a construction of joint that may be more economically manufactured and which will be more rigid in construction and will withstand greater stresses in the use thereof.

An object of the invention resides in the construction and design of the various parts, and their mode of assemblage, whereby the parts may be more readily machined and shaped and more quickly assembled while at the same time adding to the ruggedness of the joint.

Basically, the invention consists of a pair of couplers having concavities in which is adjustably mounted a ball having circumferentially extending intersecting grooves, and novel forms of clips detachably secured to the couplings and encircling the ball in adjustable relationship with the walls of the grooves of the ball.

An additional feature of the invention resides in the novel features of a cover whereby the joint may be protected and lubricant forced into effective engagement with movable parts of the joint.

In order that the invention and its mode of operation may be readily understood by those skilled in the art, I have, in the accompanying drawings and in the detailed description based thereupon, set out a possible embodiment of the invention.

In these drawings:

Figure 1 is a side elevation of one form of joint illustrating the flexible cover in cross section;

Figure 2 is a longitudinal sectional view;

Figure 3 is an elevation of the front face portion of one of the couplers;

Figure 4 is a side elevation of the clip;

Figure 5 is a side elevation of the ball;

Figure 6 is a cross sectional view of the flexible cover detached from the joint;

Figure 7 is a cross sectional view of the cover clamp;

Figure 8 is a side elevation of another form of the invention;

Figure 9 is a longitudinal sectional view of that form of the invention illustrated in Figure 8;

Figure 10 is a side elevation of the clip shown in Figure 9;

Figure 11 is an elevation of the front face portion of one of the couplers shown in Figure 9;

Figure 12 is a side elevation of another modification of the invention;

Figure 13 is a longitudinal sectional view of the modification shown in Figure 12;

Figure 14 is an elevation of the front face of one of the couplers shown in Figure 12.

Referring to the drawings and particularly to that form of the invention shown in Figures 1 to 7, inclusive, the numerals 1 and 2 designate a pair of couplers preferably of cylindrical outline to facilitate the machining thereof and each consisting of a tube 3 and a head 4 that is provided with a concavity 5 in the front face 6 thereof, and a bore 7. Each head 4 is provided with a pair of holes 8 inclining relative to each other and relative to the axis of the couplers for the purpose hereinafter explained.

Adjustably mounted in the concavities 6 of the couplers is a ball 9 having circumferentially extending intersecting grooves 10 and 11, each of which is preferably of circular cross section for the purpose hereinafter set forth.

Adjustably associated with each ball and attachably and detachably connected to each coupler is a pair of connectors or clips 12 and 13, each of U-shaped formation to provide substantially paralleling prongs 14 and 15 and a yoke 16 connecting the prongs together and arranged in a groove of the ball 9. The yoke 16 is provided with chamfered surfaces 17 for the purpose of allowing a greater angular adjustment between the couplers.

The clips are circular in cross section so as to conform with the circular formation of the grooves 10 and 11 and the prongs 14 and 15 are sprung towards each other and forced through the holes 8, thereby bringing about a more rigid connection between the clips and the couplers. For the purpose of more securely attaching the clips to the couplers, the free end portions 18 are extended a slight distance beyond the holes 8 and upset, as shown at 19. It is, of course, to be understood that these end portions 18 may be electrically spot-welded or mutilated in various manners to assure the desired connection.

In the use of the joint, it is advantageous to cover and protect the movable parts and, further, subject the same to a lubricating action. For this purpose, there is provided a flexible cover 20 which, as shown in Figure 6, is constructed of a flexible material of any desired character, but preferably of rubber. This cover 20 is provided with beads 21 and 22 removably mounted in grooves 23 and 24 provided in the couplers and secured in the grooves by clamps 25. Each clamp consists of a split annular band 26 that presses a bead in the groove and an annular split flange 27 that embraces a portion of the body portion 28 of the cover so as to provide a more effective engagement between the cover and the couplers and, in addition, reinforce the cover against distortion in the use thereof.

In the use of the joint, a lubricant is arranged in the cover 20. When the universal joint is in straight position with the couplers 1 and 2 in axial alignment, the various relatively movable parts of the joint are substantially free of working or rubbing action against each other. When the joint is deflected and the couplers 1 and 2 are angularly related, a substantial portion of the cover 20 hugs the outside angle of the joint for pressing a group of ribs 29 against the joint to confine the lubricant against the joint and force the lubricant through and between working or rubbing surfaces of the various relatively movable parts of the joint.

Referring to the modification shown in Figures 8 to 11 inclusive, the couplers 30 and 31 are similar in construction to the couplers 1 and 2 with the exception that slots or recesses 33 and 34 are provided in the front faces of the couplers and these recesses communicate with the concavities of the couplers. The ball 32 is similar in construction to the ball 5 with the exception that the grooves are not circular in cross section.

A novel feature of the joint shown in Figures 8 and 9 resides in the construction of the connectors or clips 35 and 36 and the mode of connection of the clips to the couplers.

As clearly shown in Figure 10, each clip consists of a ring-shaped portion 37 having chamfered surfaces 38 and integral wings 39 and 40 that are removably mounted in the recesses 33 and 34. The clip is further provided with a cylindrical shank 41 removably mounted in the bore 42 of the associated coupler. This shank 41 is split to provide the lugs 43 and 44, each of which is provided with an arcuate groove 45 and a flange 46 adapted to move into interlocking engagement with the shoulder 47 provided by the associated coupler. A wedge element in the form of a tapering pin 48 is provided and this pin is driven through the associated coupler and into wedging engagement with the walls of the groove 45 so as to separate the lugs and move the flange 46 into interlocking or abutting engagement with the shoulder 47.

In relation to the modification shown in Figures 12 to 14 inclusive, the connectors or clips 49 are somewhat modified in construction in that they are of uniform thickness and the lugs 50 and 51 are square or oblong in cross section, and are not provided with flanges for interlocking engagement with the shoulder provided by the coupler. The clips 49 are provided with wings 52 seated in slots 53 in the coupler so as to assure a more rigid connection between the clips and the coupler.

From the foregoing, it is evident that a very substantial rugged type of universal joint is provided having the maximum amount of universal movement. The manufacturing and assembly cost is materially reduced due to the fact that simplified machining operations may be resorted to and the parts very readily assembled into co-operative relationship.

Forming the clip shown in Figure 4 of round stock metal and forcing the prongs thereof into the inclined openings and upsetting the ends thereof, or spot-welding the same, greatly reduces the cost of manufacture and materially adds to the ruggedness of the joint in resisting excessive strains.

The interlocking engagement between parts of the clips and the couplers, as shown in Figures 9 and 13, increases the rigidity of the connections between the clips and the couplers and further facilitates the assemblage operation.

The novel construction of the cover not only facilitates the mounting of the cover upon the joint, but also provides more efficient lubrication of the parts. The design of the clamp and its relationship with the cover and the couplers assure a tight fit and proper support of the cover and materially reduce the cost of manufacture.

What I claim is:

1. A universal joint comprising: a pair of cylindrical couplers; a ball; a pair of clips adjustably connecting the ball to the couplers; and a flexible cover for said ball; each of said couplers consisting of a cylindrical tube having a circumferential groove receiving the ends of one clip and a head provided with a concavity in the front face thereof, said ball seated in the concavities of said heads and provided with intersecting circular grooves; each of said clips consisting of paralleling prongs attachably and detachably connected to the head of one of said couplers and having a yoke portion seated in one of the grooves of said ball; said flexible covering enclosing said heads and said ball and having interiorly arranged lubrication splashing ribs and further having beads seated in the grooves of said cylinder and abutting the clip ends therein, and split rings for holding the ribs in said grooves.

2. A universal joint comprising: a pair of couplers each having a head provided with a concavity and a pair of holes inclining relative to each other; a ball seated in the concavities of said heads and having intersecting circumferentially extending grooves; and a clip for each coupler of U-shaped formation having a yoke portion adjustably mounted in a groove of the ball and substantially paralleling prongs sprung into position within the inclined holes of said head and having its end portions upset and secured against an external peripheral surface of the associated head of the coupler.

FREDERICK C. GOOD.

REFERENCES CITED

The following references are of record in the file of this patent:

UNITED STATES PATENTS

| Number | Name | Date |
|---|---|---|
| 801,934 | Toney | Oct. 17, 1905 |
| 1,177,766 | Eden | Apr. 4, 1916 |
| 2,024,912 | Curtis | Dec. 17, 1935 |
| 2,030,074 | Poole | Feb. 11, 1936 |
| 2,113,441 | Curtis et al. | Apr. 5, 1938 |
| 2,264,728 | Stillwagon et al. | Dec. 2, 1941 |
| 2,290,776 | Stillwagon | July 21, 1942 |

FOREIGN PATENTS

| Number | Country | Date |
|---|---|---|
| 3,922 | Great Britain | 1913 |
| 266,759 | Germany | Oct. 30, 1913 |
| 325,019 | Germany | Sept. 7, 1920 |